(12) United States Patent
Ma (10) Patent No.: US 12,304,592 B2
(45) Date of Patent: May 20, 2025

(54) BICYCLE ECCENTRIC PULLEY WHEEL (71) Applicant: Huang-Kun Ma, Taichung (TW)

(72) Inventor: Huang-Kun Ma, Taichung (TW)

( * ) Notice: Subject to any disclaimer, the term of this patent is extended or adjusted under 35 U.S.C. 154(b) by 0 days.

(21) Appl. No.: 18/410,048

(22) Filed: Jan. 11, 2024

(65) Prior Publication Data

US 2024/0270347 A1 Aug. 15, 2024

(30) Foreign Application Priority Data

Feb. 10, 2023 (TW) ................... 112201198

(51) Int. Cl.
*B62M 9/08* (2006.01)
*B62M 9/121* (2010.01)
*B62M 9/126* (2010.01)

(52) U.S. Cl.
CPC .............. *B62M 9/08* (2013.01); *B62M 9/085* (2013.01); *B62M 9/121* (2013.01); *B62M 9/126* (2013.01)

(58) Field of Classification Search
CPC ........ B62M 9/126; B62M 9/08; B62M 9/085; B62M 9/121; B62M 9/124; B62M 2009/12406; B62M 9/16; F16H 55/30; F16H 2055/303
USPC ......................................................... 474/80
See application file for complete search history.

(56) References Cited

U.S. PATENT DOCUMENTS

| | | | | |
|---|---|---|---|---|
| 3,960,025 A * | 6/1976 | Hippolyte Juy | ....... | B62M 9/126 474/82 |
| 4,058,020 A * | 11/1977 | Huret | ..................... | B62M 9/126 474/80 |
| 4,226,131 A * | 10/1980 | Yamasaki | ............... | B62M 9/126 474/134 |
| 4,410,313 A * | 10/1983 | Shimano | ................. | B62M 9/128 474/134 |
| 4,433,963 A * | 2/1984 | Shimano | .................. | B62M 9/16 474/134 |
| 5,350,339 A * | 9/1994 | Carmichael | ............ | B62M 9/126 474/120 |
| 5,466,194 A * | 11/1995 | Steinberg | ................. | B62M 9/16 474/80 |
| 5,711,731 A * | 1/1998 | Fukuda | .................... | B62M 9/16 474/160 |
| 7,244,203 B2 * | 7/2007 | Sze | ........................ | B62M 9/126 474/82 |
| 10,696,357 B2 * | 6/2020 | Lazzarin | ................. | B62M 9/121 |
| 11,661,143 B2 * | 5/2023 | Braedt | ..................... | B62M 9/16 474/78 |
| 11,661,144 B2 * | 5/2023 | Golec | .................... | B62M 9/126 474/80 |

(Continued)

FOREIGN PATENT DOCUMENTS

| | | | | | |
|---|---|---|---|---|---|
| CN | 209776722 U | * | 12/2019 | ............ | B62M 9/126 |
| DE | 202012100782 U1 | * | 5/2012 | ............ | B62M 9/121 |
| TW | M658148 U | * | 7/2024 | ............ | B62M 9/126 |

*Primary Examiner* — Anna M Momper
*Assistant Examiner* — Raveen J Dias
(74) *Attorney, Agent, or Firm* — Best & Flanagan LLP (57) ABSTRACT A bicycle eccentric pulley wheel having a chainring, a bearing, and at least one side cover. The chainring is rotatably mounted on the bearing, and the side cover is fixed to the bearing. The side cover is a hollow disk and includes an annular flange formed in an axial direction. The inner side of the annular flange includes a raised portion facing towards a center. The raised portion includes an eccentric hole, which is offset from the center defined by the side cover.

9 Claims, 11 Drawing Sheets (56) References Cited

U.S. PATENT DOCUMENTS

| | | | |
|---|---|---|---|
| 2002/0068653 A1* | 6/2002 | Dal Pra | B62M 9/16 |
| | | | 474/82 |
| 2004/0204274 A1* | 10/2004 | Young | F16H 55/30 |
| | | | 474/100 |
| 2005/0192138 A1* | 9/2005 | Sze | B62M 9/126 |
| | | | 474/83 |
| 2010/0227718 A1* | 9/2010 | Chen | B62M 9/16 |
| | | | 474/79 |
| 2017/0259881 A1* | 9/2017 | Lazzarin | B62M 9/121 |
| 2021/0371048 A1* | 12/2021 | Golec | F16C 35/067 |
| 2024/0271663 A1* | 8/2024 | Csizmadia | F16C 33/76 |

* cited by examiner

BICYCLE ECCENTRIC PULLEY WHEEL

FIELD OF INVENTION

The present invention relates to a bicycle pulley wheel, particularly to a bicycle eccentric pulley wheel.

BACKGROUND OF THE INVENTION

With the flourishing development of the bicycle industry, users have increasingly higher expectations for the appearance, performance, and riding experience of bicycles. Conventional rear derailleur pulley set on bicycles usually uses a standard-sized pulley with 11 teeth. Nevertheless, many users seek to enhance the smooth passage of the chain through the pulley wheel and improve shifting performance by increasing the size of the rear derailleur pulley wheel.

However, the design of the original derailleur cage and rear derailleur hanger of a bicycle may be incompatible with a larger pulley wheel. This discrepancy requires users to replace the entire rear derailleur pulley set, and this causes adding complexity to the replacement process and wasting a significant amount of material.

SUMMARY OF THE INVENTION

To address the issues of complexity in the replacement process and material waste associated with the past practice of needing to replace the entire pulley set when attempting to increase pulley wheel size, this present invention discloses a bicycle eccentric pulley wheel characterized in that the bicycle eccentric wheel comprises a chainring, a bearing, and at least one side cover, wherein the chainring is rotatably mounted on the bearing, and the side cover is fixed on the bearing, wherein the side cover is a hollow disk comprising an annular flange extended longitudinally, an inner side of the annular flange comprises a raised portion facing towards a center of the side cover, the raised portion comprises an eccentric hole, and the eccentric hole offsets from the center of the side cover.

Wherein, the bearing is a hollow annular structure comprising an inner ring and an outer ring, wherein the outer ring is positioned around an outer side of the inner ring, and the inner ring can rotate relative to the outer ring.

Wherein, the side cover comprises an outer disc formed radially, wherein the outer disc is connected to the annular flange, and the annular flange is attached and fixed to the inner ring of the bearing, and the outer disc completely covers a side edge of the bearing and partially covers an inner part of the chainring close to the center, and the outer disc maintains a gap with the chainring.

Wherein, an outer part of the chainring comprises 12 to 18 teeth used to engage with a bicycle chain.

Wherein, a distance from the eccentric hole to the center is between 0.1 to 0.8 times of a distance from the outer perimeter of the annular flange to the center.

Wherein, the bicycle eccentric pulley wheel comprises two of the side covers, and each of the eccentric hole of the side covers are interconnected.

Wherein, the eccentric hole of the raised portion is surrounded by a counterbore.

Wherein, a circular inner surface of the eccentric hole comprises a serrated structure or multiple raised ridges and grooves.

Wherein, the side cover comprises at least one engaging portion, wherein the engaging portion protrudes along an axial direction on a part of a periphery of the outer disc.

Wherein, the outer part of the chainring comprises 18 teeth used to engage with a bicycle chain.

DETAILED DESCRIPTION OF THE PREFERRED EMBODIMENTS

As indicated in the present invention and the claims, unless otherwise explicitly indicated in the context, terms such as "one," "a," "an," or "the" are not limited to singular form and can include plural forms. Generally, the terms "comprising" and "including" only indicate the inclusion of explicitly identified steps and elements, which do not exclude the presence of other steps or elements. Methods or devices may also include additional steps or elements.

Figure 1:
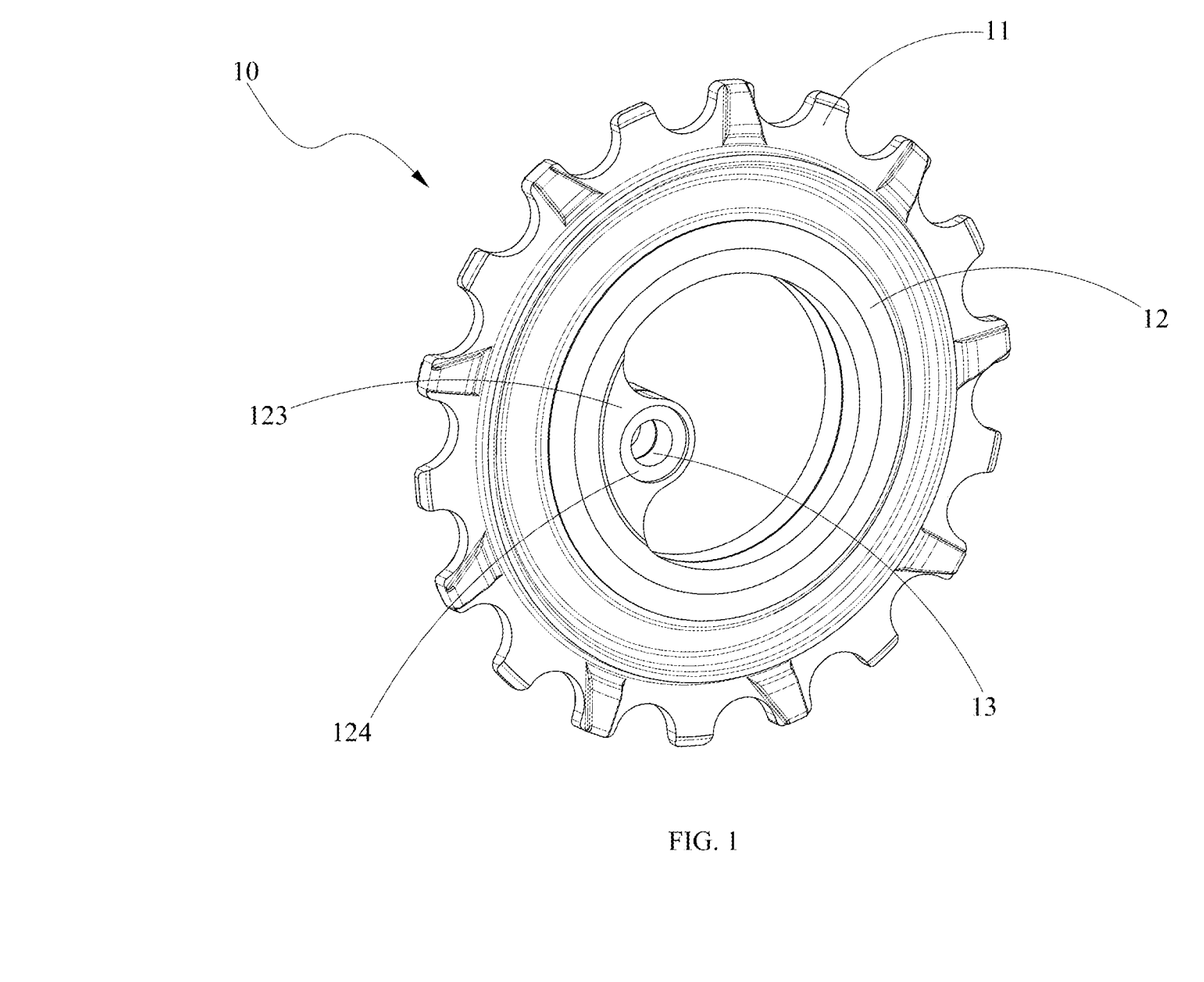
FIG. 1 is a perspective view of a first preferred embodiment of a bicycle eccentric pulley wheel in accordance with the present invention.
Figure 3:
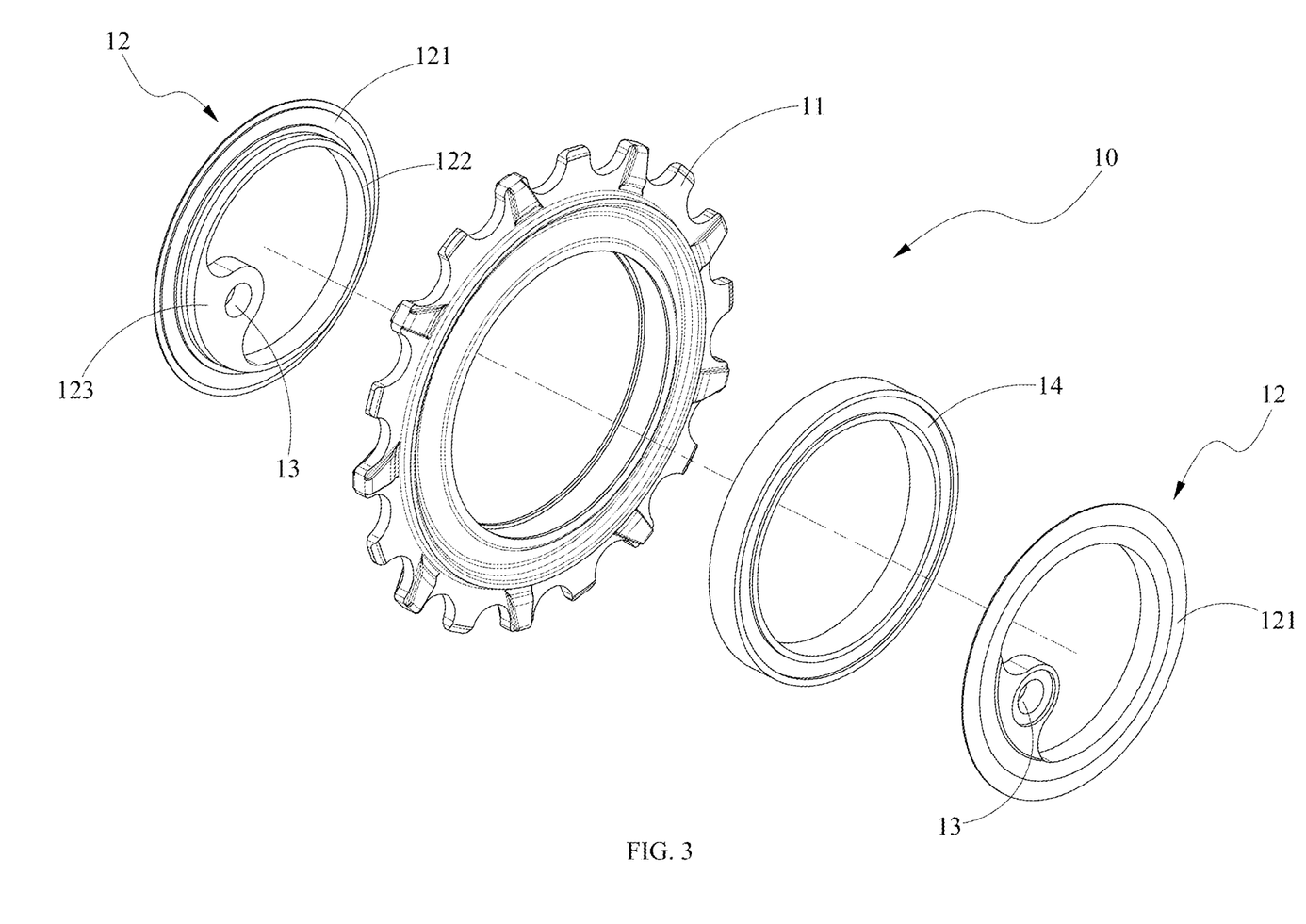
FIG. 3 is an exploded view of the first embodiment of a bicycle eccentric pulley wheel in FIG. 1.
Figure 4:
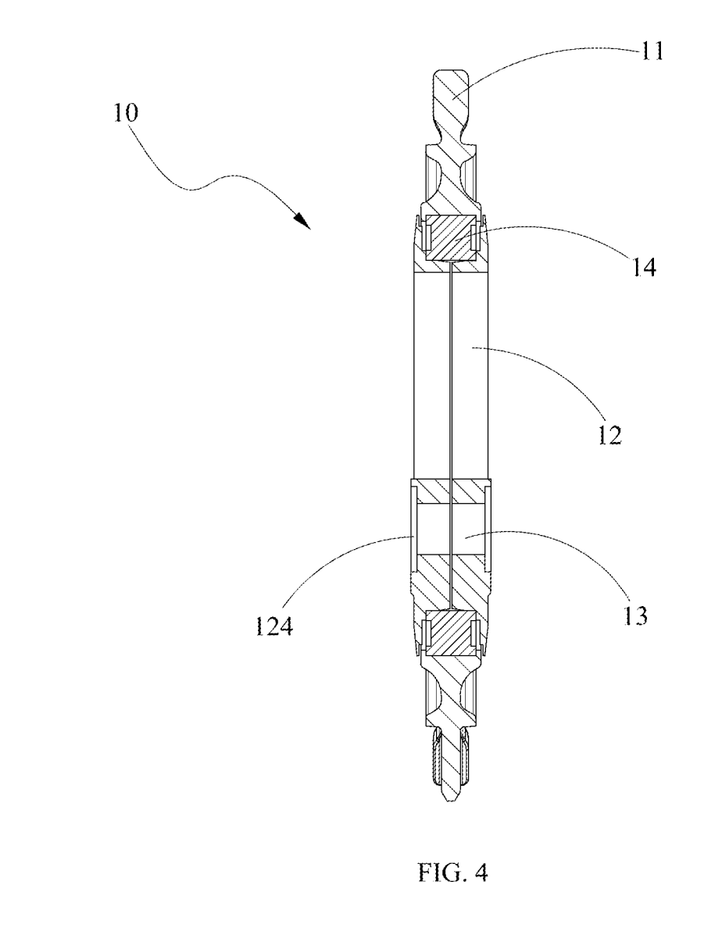
FIG. 4 is a cross-sectional view of the first embodiment of a bicycle eccentric pulley wheel in FIG. 1.

With reference to FIG. 1, FIG. 3, and FIG. 4, a first preferred embodiment of a bicycle eccentric pulley wheel 10 in accordance with the present invention is shown. The bicycle eccentric pulley wheel 10 includes a chainring 11, a bearing 14, and at least one side cover 12.

The bearing 14 is a hollow circular ring and has an inner ring and an outer ring, and the outer ring is disposed around an outside of the inner ring. The inner ring can rotate relative to the outer ring. An inner wall of the chainring 11 is provided with an annular groove. The outer ring of the bearing 14 can be securely placed in the annular groove, and the chainring 11 is interlinked with the outer ring.

Each one side cover 12 is a hollow disk. The side cover 12 includes an outer disc 121 and an annular flange 122 protrudes longitudinally around the outer disc 121. The annular flange 122 is attached and secured to the inner ring of the bearing 14, and the annular flange 122 moves in conjunction with the inner ring of the bearing 14. The outer disc 121 completely covers one side of the bearing 14 and partially covers an inner part of the chainring 11 being close to the center of the chainring 11. In addition, the side cover 12 does not come into contact with the chainring 11. A gap is maintained between the outer disc 121 of the side cover 12 and the chainring 11 to allow the chainring 11 to rotate smoothly without interference from the side cover 12. Preferably, an outer part of the chainring 11 includes 12 to 18 teeth that can engage with a bicycle chain.

In the first preferred embodiment, the bicycle eccentric pulley wheel 10 includes two side covers 12. The annular flanges 122 of the two side covers 12 are respectively assembled with and secured to the opposite sides of the bearing 14 via the inner edge of the bearing 14. The outer discs 121 of the two side covers 12 respectively cover the opposite sides of the bearing 14 and the two sides of the chainring 11 being close to the center of the chainring 11. However, neither the side covers 12 comes into contact with the chainring 11 to enable the chainring 11 to rotate smoothly without interference from the side covers 12. In this preferred embodiment, the outer part of the chainring 11 includes 18 teeth.

In addition, the inner wall of the annular flange 122 of the side cover 12 contains a radially protruding raised portion 123. The raised portion 123 includes an eccentric hole 13, and the center of the eccentric hole 13 deviates from a central point defined by the annular flange 122 of the side cover 12. A distance from the central point to an outer perimeter of the annular flange 122 of the side cover 12 is defined as one unit in this specification. Preferably, a center of the eccentric hole 13 in the eccentric hole 13 is located at a distance of 0.1 to 0.8 unit from the central point. In this preferred embodiment, the center of the eccentric hole 13 in each of the two side covers 12 are located at a distance of 0.4 unit from the central point. When the two side covers 12 are assembled on the bearing 14, the eccentric holes 13 in the two side covers 12 are aligned and interconnected with each other.

Figure 2:
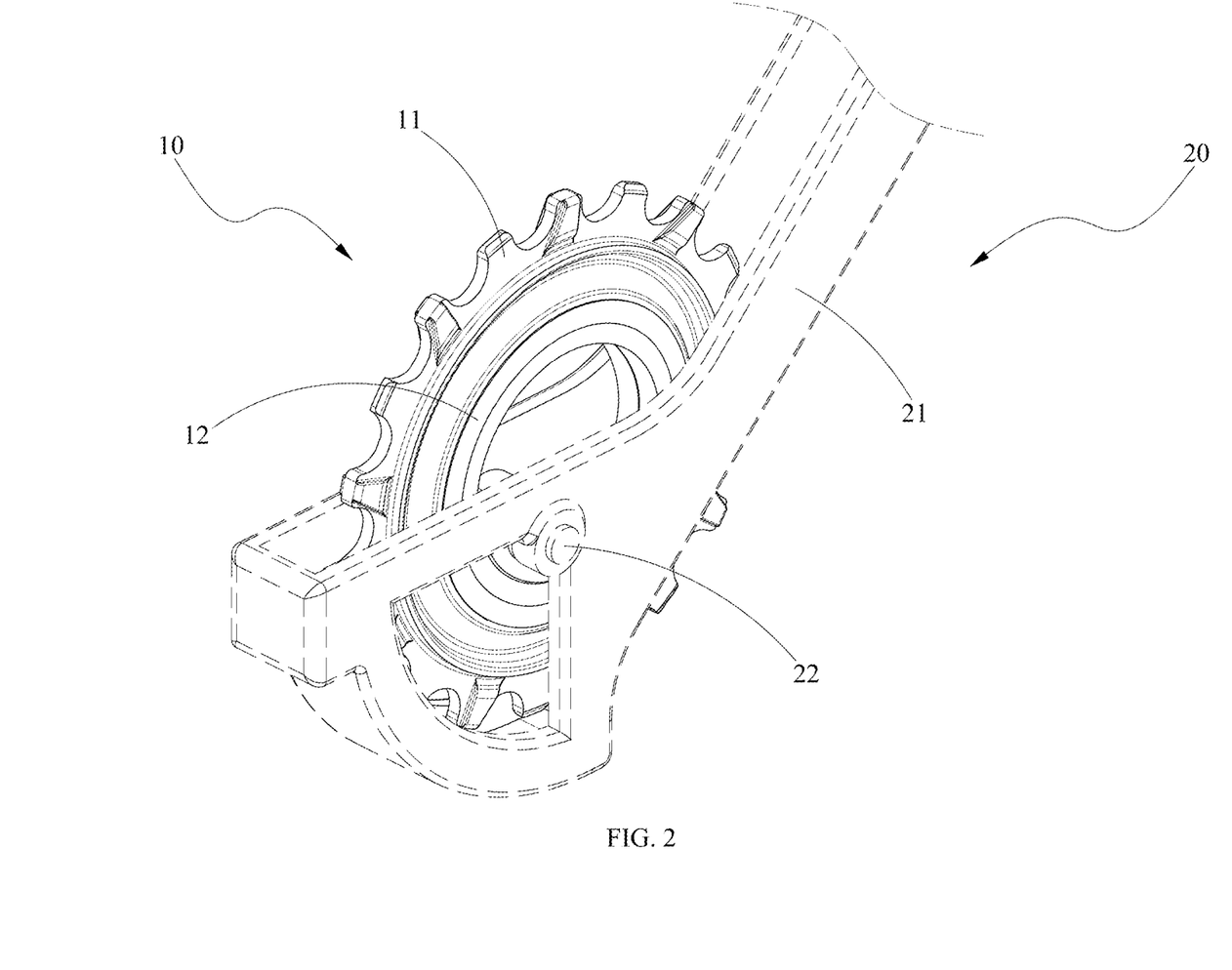
FIG. 2 is a perspective view illustrating an installation and usage of the first preferred embodiment of a bicycle eccentric pulley wheel in FIG. 1.

With reference to FIG. 2, the first preferred embodiment of the bicycle eccentric pulley wheel 10 in accordance with present invention is installed onto a derailleur cage 20 of a standard conventional rear derailleur pulley set. The bicycle eccentric pulley wheel 10 is installed with aligning the eccentric holes 13 of the bicycle eccentric pulley wheel 10 with the corresponding lower pulley mounting holes 22 on the derailleur cage 20 and securing with a pulley bolt, the bicycle eccentric pulley wheel 10 is installed between the two cage plates 21 of the derailleur cage 20. Preferably, the bicycle eccentric pulley wheel 10 is installed on the derailleur cage 20 in a position where the eccentric hole 13 to the outer perimeter of the annular flange 122 of the side cover 12 has the shortest distance facing towards connected ends of the two cage plates 21 of the derailleur cage 20. This arrangement ensures that the chainring 11 can rotate without interference with the two cage plates 21 of the derailleur cage 20.

Therefore, although a radius of the chainring 11 may be greater than a distance from the lower pulley mounting hole 22 to the connected ends of the two cage plates 21, a minimum distance from the eccentric hole 13 to the outer perimeter of the chainring 11 is smaller than the distance from the lower pulley mounting hole 22 to the connected ends of the two cage plates 21. This allows the bicycle eccentric pulley wheel 10 to be installed on the derailleur cage 20 of the rear derailleur pulley set and achieve the effect of increasing the size of a lower pulley wheel.

Figure 5:
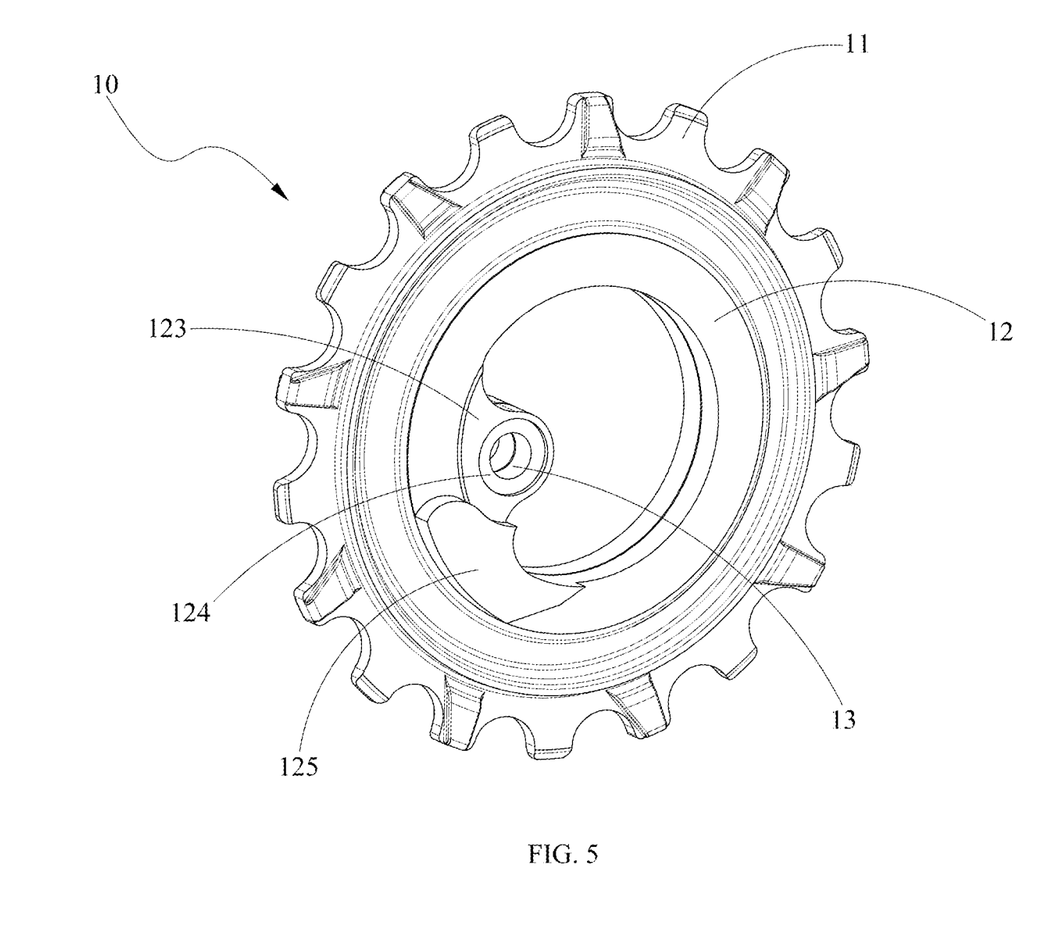
FIG. 5 is a perspective view of a second preferred embodiment of a bicycle eccentric pulley wheel in accordance with the present invention.

To enhance the fixation capability of the eccentric hole 13, to ensure that the raised portion 123 does not rotate along with the lower pulley mounting hole 22, and to prevent potential sliding and interference between the bicycle eccentric pulley wheel 10 and the derailleur cage 20, the eccentric hole 13 further incorporates with a reinforced fixing structure. In the second preferred embodiment, the raised portion 123 includes a counterbore structure 124 surrounding the eccentric hole 13. The counterbore structure 124 can accommodate various suitable locking devices, such as retaining washers, to prevent the rotation of the bicycle eccentric pulley wheel 10. In another preferred embodiment, a circular inner surface of the eccentric hole 13 includes a serrated structure. This serrated structure increases the surface area of the circular inner surface of the eccentric hole 13, thereby the friction between the eccentric hole 13 and a fastener of the lower pulley mounting hole 22 is enhanced to prevent sliding of the bicycle eccentric pulley wheel 10. In another preferred embodiment, the circular inner surface of the eccentric hole 13 includes multiple raised ridges and grooves. This configuration ensures a secure connection between the eccentric hole 13 and the fastener in the lower pulley mounting hole 22 to prevents the rotation of the bicycle eccentric pulley wheel 10.

Figure 6:
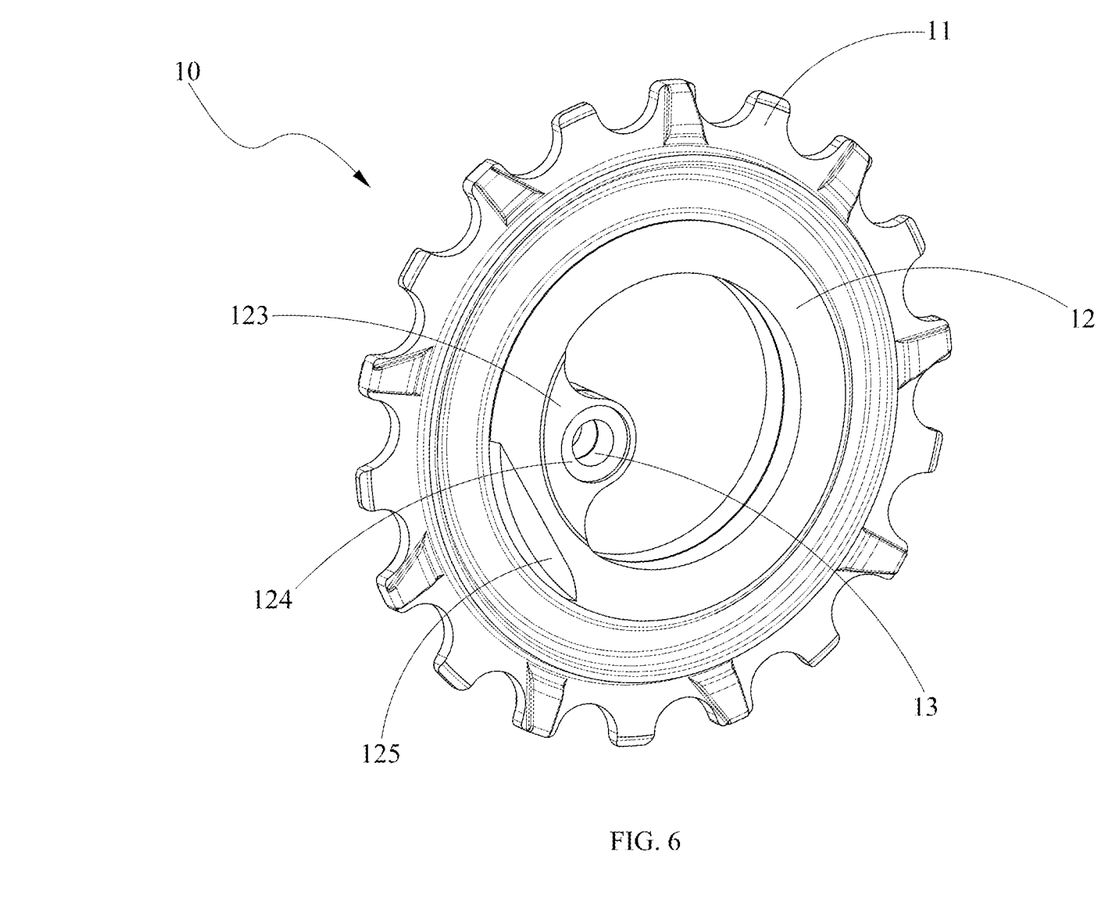
FIG. 6 is a perspective view of a third preferred embodiment of a bicycle eccentric pulley wheel in accordance with the present invention.
Figure 7:
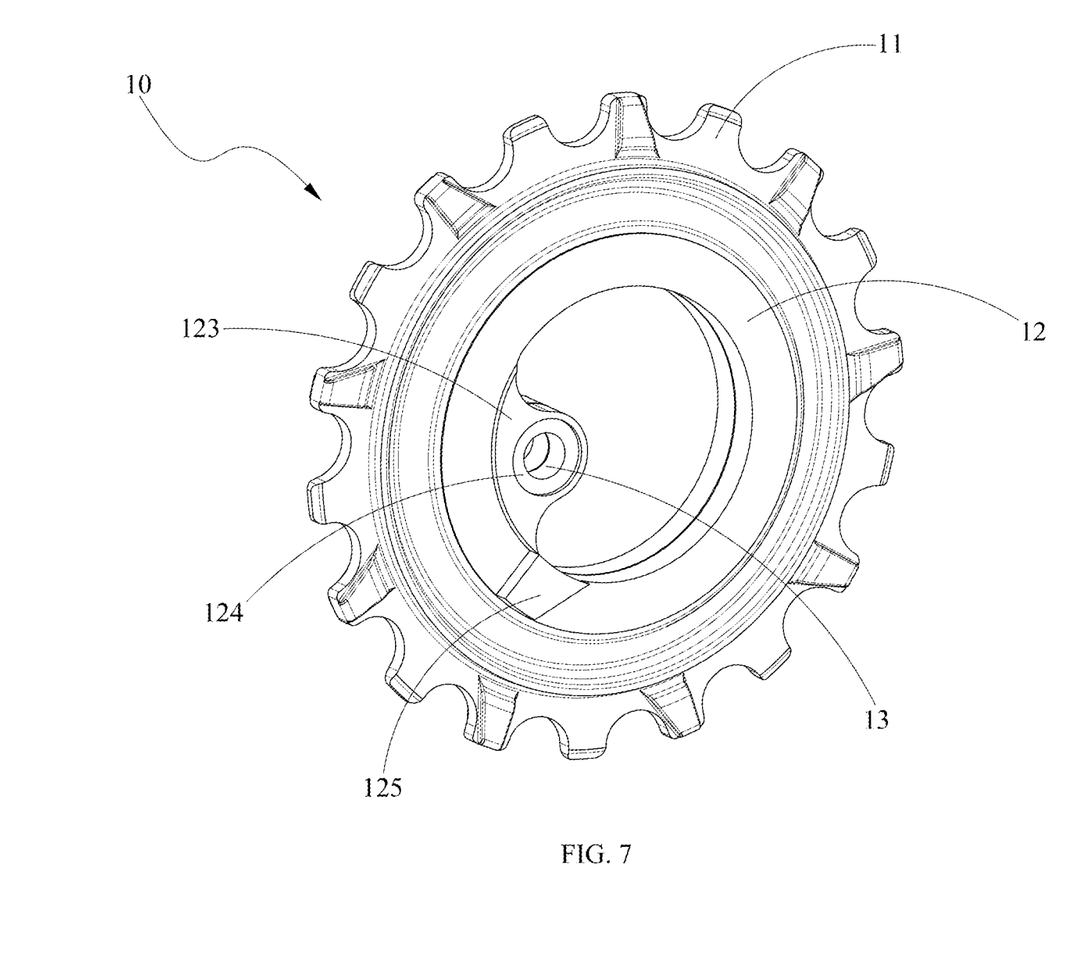
FIG. 7 is a perspective view of a fourth preferred embodiment of a bicycle eccentric pulley wheel in accordance with the present invention.

With reference to FIG. 5 to FIG. 7, a second preferred embodiment, a third preferred embodiment, and a fourth preferred embodiment of the bicycle eccentric pulley wheels 10 in accordance with the present invention are shown. In these preferred embodiments, the side cover 12 of the bicycle eccentric pulley wheel 10 includes at least one engaging portion 125, and the engaging portions 125 protrudes longitudinally along a part of the periphery of the outer disc 121.

With reference to FIG. 8 to FIG. 11, the bicycle eccentric pulley wheels 10 of the fifth preferred embodiment, the sixth preferred embodiment, the seventh preferred embodiment, and the eighth preferred embodiment in accordance with present invention installed onto the derailleur cages 20 of the standard conventional rear derailleur pulley sets are shown. Preferably, the engaging portion 125 interlocks with the cage plate 21 of the derailleur cage 20 to ensure that the raised portion 123 does not rotate along the lower pulley mounting hole 22. This arrangement prevents sliding of the bicycle eccentric pulley wheel 10 and interference with the derailleur cage 20.

Figure 8:
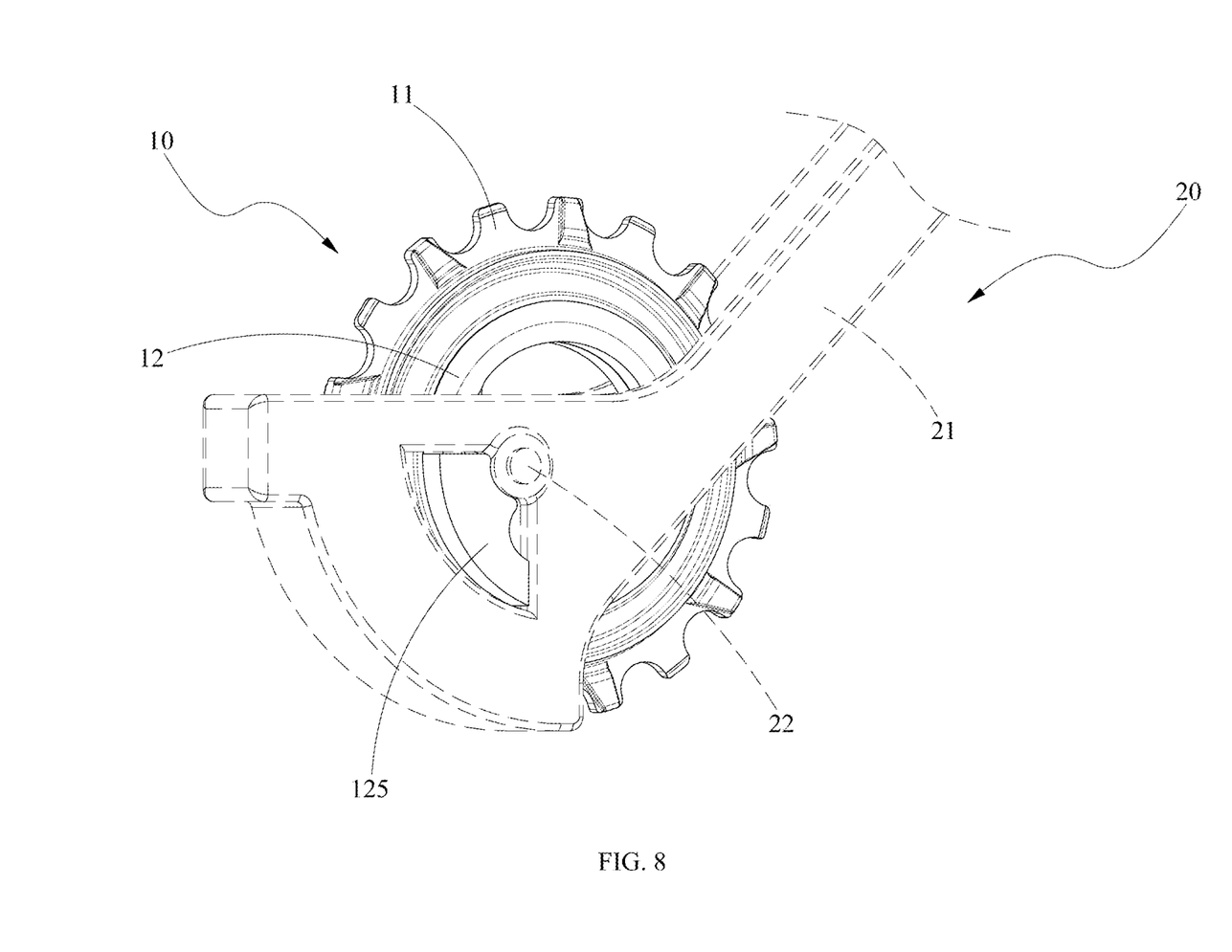
FIG. 8 is a perspective view illustrating an installation and usage of a fifth preferred embodiment of a bicycle eccentric pulley wheel in accordance with the present invention.

In the fifth preferred embodiment, as shown in FIG. 8, the engaging portion 125 protrudes along a part of the periphery of the outer disc 121. The engaging portion 125 corresponds to and stays within a hole formed in the derailleur cage 20 to secure the outer disc 121 to the derailleur cage 20 without sliding or rotation.

Figure 9:
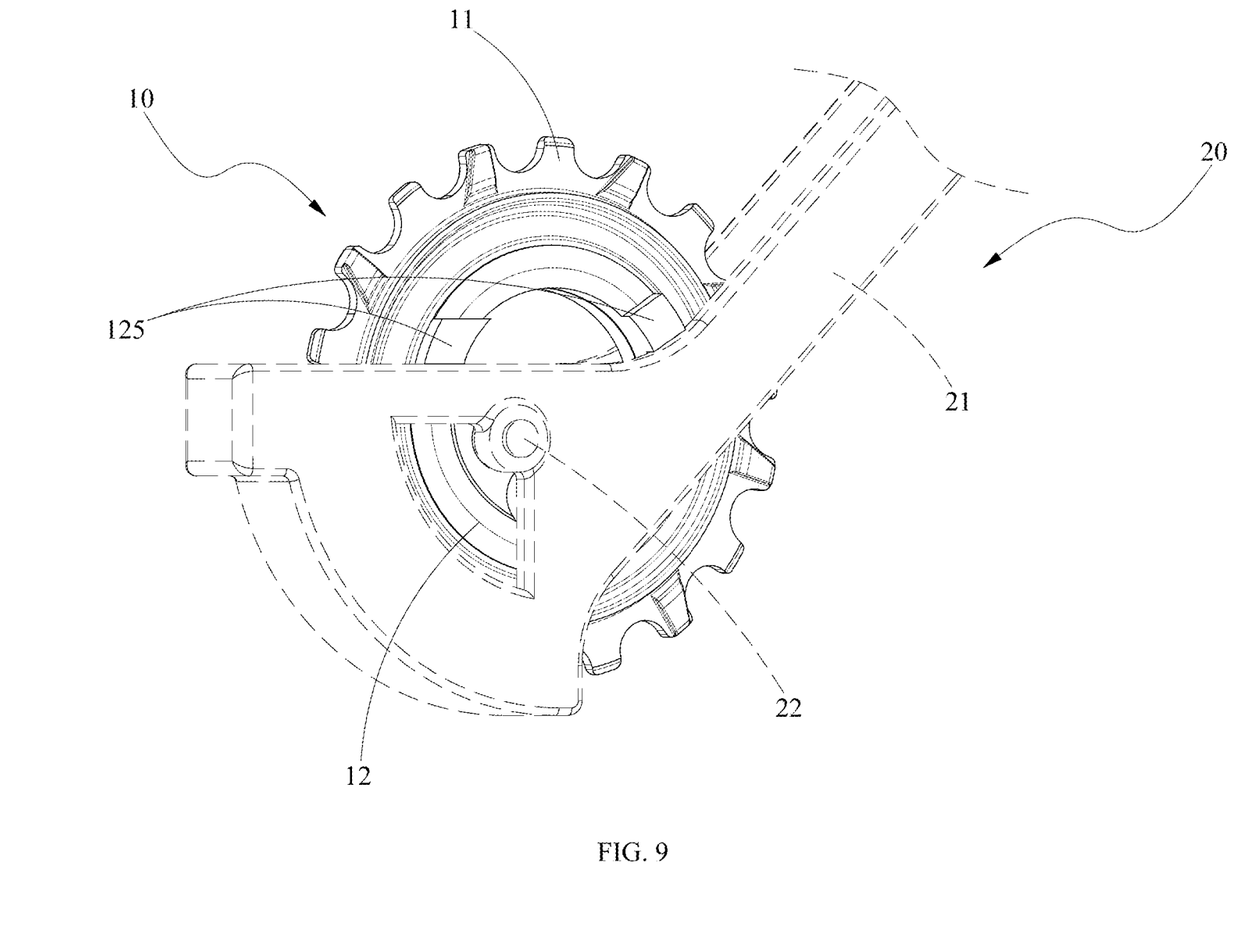
FIG. 9 is a perspective view illustrating an installation and usage of a sixth preferred embodiment of a bicycle eccentric pulley wheel in accordance with the present invention.

In the sixth preferred embodiment, as shown in FIG. 9, two engaging portions 125 protrude respectively along two parts of the periphery of the outer disc 121. The two engaging portions 125 are positioned on the same side of the derailleur cage 20 to secure the outer disc 121 to the derailleur cage 20 without sliding or rotation.

Figure 10:
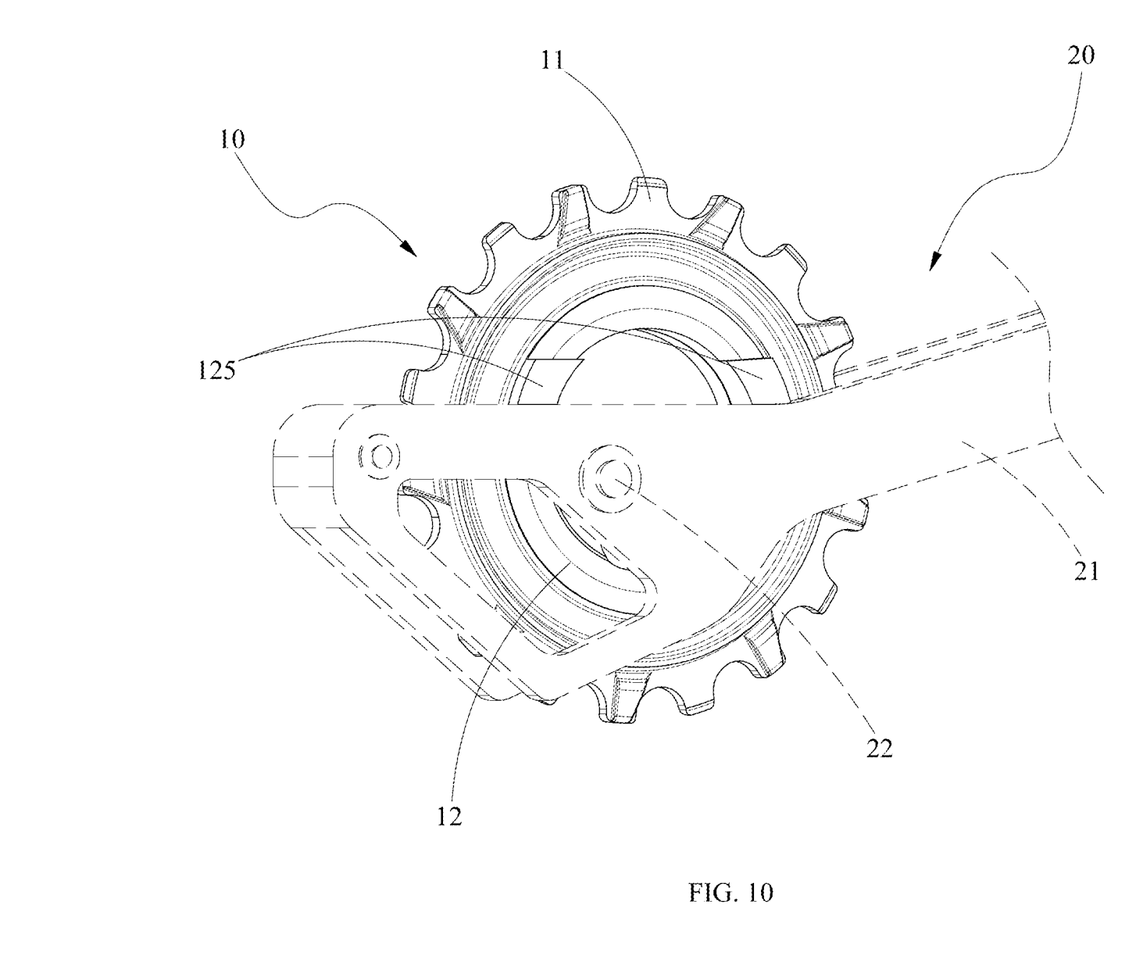
FIG. 10 is a perspective view illustrating an installation and usage of a seventh preferred embodiment of a bicycle eccentric pulley wheel in accordance with the present invention.
Figure 11:
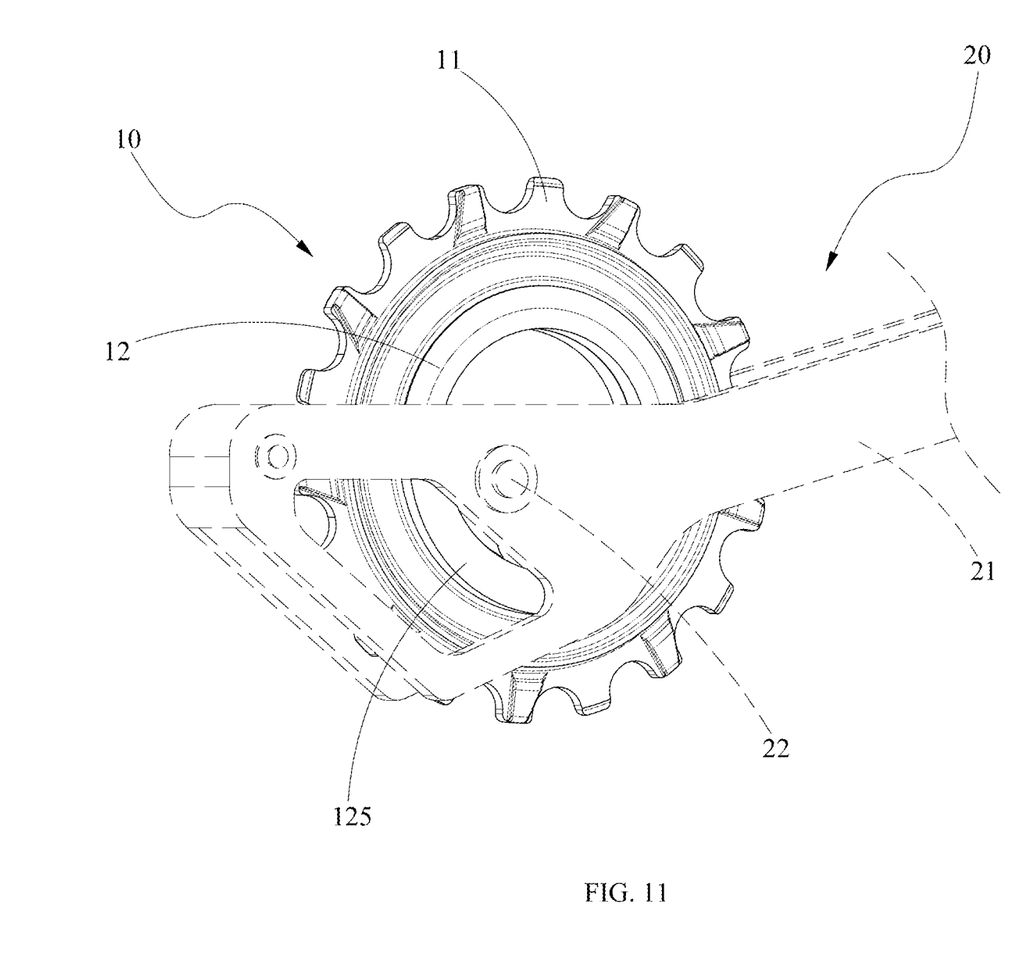
FIG. 11 is a perspective view illustrating an installation and usage of an eighth preferred embodiment of a bicycle eccentric pulley wheel in accordance with the present invention.

In the seventh and eighth preferred embodiments, as shown in FIG. 10 and FIG. 11, when applied to derailleur cages 20 with structures different from the aforementioned embodiments, shapes and location of the engaging portion 125 of the bicycle eccentric pulley wheel 10 can be configured to adapt to the derailleur cages 20 as described in the fifth or sixth preferred embodiment. The engaging portion 125 corresponds to and stays within the hole formed in the derailleur cage 20, or two engaging portions 125 can be positioned on the same side of the derailleur cage 20 to achieve the effect of securing the outer disc 121 to the derailleur cage 20 without sliding, as described in the previous embodiments.

Based on the aforementioned description, the present invention has the following advantages:
1. The technical feature of the eccentric hole 13 of the bicycle eccentric pulley wheel 10 in the present invention helps users to replace the pulley wheel without the need to replace the entire rear derailleur pulley set. This enables the enlargement of the pulley wheel to reduce wear and tear and to improve transmission efficiency. The invention significantly enhances the riding experience while saving extra costs and resources.
2. The bicycle eccentric pulley wheel 10 of the present invention features one eccentric hole 13 positioned in a raised portion 123. This makes the bicycle eccentric pulley wheel 10 mostly hollow, significantly reducing the amount of material used. This approach also contributes to lightweight bicycle construction and to reduce the use of raw materials, and has lowers costs.

What is claimed is:

1. A bicycle eccentric pulley wheel, characterized in that the bicycle eccentric wheel comprises a chainring, a bearing, and at least one side cover, wherein the chainring is rotatably mounted on the bearing, and the at least one side cover is fixed on the bearing, wherein the at least one side cover is a hollow disk comprising an annular flange extended longitudinally, an inner side of the annular flange comprises a raised portion facing towards a center of the at least one side cover, the raised portion has an eccentric hole, and the eccentric hole offsets from the center of the at least one side cover, wherein
   a distance from the eccentric hole to the center of the at least one side cover is between 0.1 to 0.8 times of a distance from an outer perimeter of the annular flange to the center of the at least one side cover, and
   at least one engaging portion protrudes longitudinally along a part of the at least one side cover, the bicycle eccentric pulley wheel allows a derailleur cage to be assembled with the chainring having a radius greater than a distance from the center to connected ends of the derailleur cage.

2. The bicycle eccentric pulley wheel according to claim 1, wherein the bearing is a hollow annular structure comprising an inner ring and an outer ring, wherein the outer ring is disposed around an outer side of the inner ring, and the inner ring can rotate relative to the outer ring.

3. The bicycle eccentric pulley wheel according to claim 2, wherein the at least one side cover comprises an outer disc connected to the annular flange, the annular flange is attached and fixed to the inner ring of the bearing, the outer disc completely covers a side edge of the bearing and partially covers an inner part of the chainring being close to the center, and the outer disc maintains a gap with the chainring.

4. The bicycle eccentric pulley wheel according to claim 3, wherein an outer part of the chainring comprises 12 to 18 teeth applied to engage with a bicycle chain.

5. The bicycle eccentric pulley wheel according to claim 4, wherein the bicycle eccentric pulley wheel comprises two side covers, and the eccentric holes of the two side covers are interconnected with other.

6. The bicycle eccentric pulley wheel according to claim 5, wherein each eccentric hole of each raised portion is surrounded by a counterbore.

7. The bicycle eccentric pulley wheel according to claim 5, wherein a circular inner surface of each eccentric hole comprises a serrated structure or multiple raised ridges and grooves.

8. The bicycle eccentric pulley wheel according to claim 5, wherein the at least one engaging portion protrudes along a part of a periphery of the outer disc.

9. The bicycle eccentric pulley wheel according to claim 3, wherein an outer part of the chainring comprises 18 teeth applied to engage with a bicycle chain.

* * * * *